US005559181A

United States Patent [19]
Chen

[11] Patent Number: 5,559,181
[45] Date of Patent: *Sep. 24, 1996

[54] STABLE CHLOROSULFONATED RESIN LATEX

[75] Inventor: John C. Chen, Hockessin, Del.

[73] Assignee: E. I. du Pont De Nemours and Company, Wilmington, Del.

[*] Notice: The term of this patent shall not extend beyond the expiration date of Pat. No. 5,102,946.

[21] Appl. No.: 477,752

[22] Filed: Jun. 7, 1995

Related U.S. Application Data

[63] Continuation-in-part of Ser. No. 866,764, Apr. 7, 1992, Pat. No. 5,491,191, which is a continuation-in-part of Ser. No. 864,118, Apr. 6, 1992, abandoned.

[51] Int. Cl.$^6$ .................................................. C08L 33/06
[52] U.S. Cl. ............................ 524/560; 524/556; 524/563; 524/572; 524/576
[58] Field of Search .................................... 524/572, 576, 524/556, 560, 563

[56] References Cited

U.S. PATENT DOCUMENTS

| | | | |
|---|---|---|---|
| 3,632,671 | 1/1972 | Furukawa et al. | 260/876 |
| 4,981,730 | 1/1991 | Zaleski | 427/393.5 |
| 5,102,946 | 4/1992 | Chen et al. | 524/527 |

FOREIGN PATENT DOCUMENTS

| | | |
|---|---|---|
| 1720700 | 5/1970 | Germany . |
| 60115679 | 6/1983 | Japan . |
| 59-166534 | 9/1984 | Japan . |
| 60-123516 | 7/1985 | Japan . |
| 1-44220 | 9/1989 | Japan . |
| 4-35484 | 6/1992 | Japan . |
| 789055 | 1/1958 | United Kingdom . |

*Primary Examiner*—Peter D. Mulcahy

[57] ABSTRACT

Self-stabilized resin latexes are provided which contain sulfonate salts produced by basic hydrolysis of chlorosulfonated $C_2C_8$ alpha-olefin polymers having chlorine contents of 20–70 weight percent and sulfur contents of 1.5–10 weight percent. Further provided is a novel composition comprising a chlorosulfonated graft-modified ethylene/propylene copolymer.

7 Claims, No Drawings

STABLE CHLOROSULFONATED RESIN LATEX

RELATED APPLICATIONS

This application is a continuation-in-part of application Ser. No. 07/866,764, filed Apr. 7, 1992, U.S. Pat. No. 5,491,191, which is a continuation-in-part of application Ser. No. 07/864,118, filed Apr. 6, 1992, now abandoned.

BACKGROUND OF THE INVENTION

This invention relates to aqueous chlorosulfonated olefin copolymer latexes which are useful in the preparation of adhesives and coating compositions.

Chlorosulfonated olefin polymers have been used as binder resins in adhesive and coating compositions for many years because the presence of chlorine along the saturated polymer backbone imparts chemical resistance and outdoor weatherability to these products. Such compositions have therefore been especially suited for use in moisture resistant adhesives and marine and industrial coatings. Although the performance characteristics of these products has been excellent, the use of such compositions has declined over the years because they are solvent-based. Heightened concern regarding the environmental impact and health hazards associated with compositions of high volatile organic content (VOC) has led to a preference in the industry for aqueous latex coating and adhesive compositions.

Limited attempts have been made to develop aqueous chlorosulfonated resin latex compositions, the objective being to maintain chemical and moisture resistance while minimizing VOC, but such attempts have met with only limited success. The high surfactant level necessary to obtain stable latexes adversely affects adhesion and, in addition, moisture barrier properties of coatings derived from the latexes have also proved to be inadequate.

The present invention provides stable aqueous chlorosulfonated latex compositions which are self-stabilized as a result of their chemical structure. Therefore, the use of conventional surfactants is not required and the problems associated with the presence of large amounts of surfactants are eliminated.

SUMMARY OF THE INVENTION

More specifically this invention is directed to a self-stabilized chlorosulfonated resin latex composition comprising an aqueous suspension of a salt of a chlorosulfonated copolymer of a $C_2$–$C_8$ alpha-olefin and a compound selected from the group consisting of $C_1$–$C_{12}$ alkyl esters of unsaturated $C_3$–$C_{20}$ monocarboxylic acids and vinyl esters of saturated $C_2$–$C_{18}$ carboxylic acids, the polymer having a chlorine content of 20–70 weight percent and a sulfur content of 1.5–10 weight percent with the proviso that the latex is substantially free of surfactants. These compositions are particularly useful as binder resins in weatherable adhesive and coating compositions.

DETAILED DESCRIPTION OF THE INVENTION

The latex compositions of the present invention contain a partially or completely neutralized salt of a chlorosulfonated $C_2$–$C_8$ alpha-olefin copolymer. The high degree of copolymer backbone chlorination contributes to the excellent chemical resistance and physical properties of films prepared from these copolymers, while the presence of a controlled amount of neutralized sulfonic acid groups, derived from hydrolysis of the sulfonyl chloride groups present in the chlorosulfonated polymer, is responsible for latex stability. As used herein the phrase stable latex means that the latex composition does not form a substantial amount of coagulum on standing within a period of two weeks at room temperature and, if any coagulum is formed, it is redispersible on gentle mixing. The acid salt groups promote latex stabilization because they function as protective colloids by enabling the development of stable interactions with the hydrated environment external to the latex particle.

The chlorosulfonated resin salts are sulfonates of chlorosulfonated $C_2$–$C_8$ alpha-olefin/ester copolymers and are formed by basic hydrolysis of the chlorosulfonated resins themselves. The term chlorosulfonated alpha-olefin/ester copolymer as used herein means those chlorosulfonated olefin/ester copolymers which contain chlorine in amounts ranging from 20–70 weight percent, and sulfur in amounts ranging from 1.5–10 weight percent, preferably 2.0–6.0 weight percent and which have average molecular weights of 1,000 to 300,000. The chlorosulfonated olefin/ester copolymers may be selected from the group consisting of chlorosulfonated copolymers of $C_2$–$C_8$ alpha monoolefins and at least one ethylenically unsaturated monomer selected from the group consisting of $C_1$–$C_{12}$ alkyl esters of unsaturated $C_3$–$C_{20}$ monocarboxylic acids and vinyl esters of saturated $C_2$–$C_{18}$ carboxylic acids. Examples of suitable olefin/ester copolymers include chlorosulfonated ethylene/vinyl acetate copolymers, chlorosulfonated ethylene/methyl acrylate copolymers, chlorosulfonated ethylene/methyl methacrylate copolymers, chlorosulfonated ethylene/n-butyl methacrylate copolymers and chlorosulfonated ethylene/glycidyl methacrylate copolymers.

Among the esters of $C_3$–$C_{20}$ monocarboxylic acids, esters of acrylic and methacrylic acid are preferred. Particularly preferred are chlorosulfonated ethylene/vinyl acetate copolymers.

The chlorosulfonated olefin/ester copolymers are generally prepared by reacting an alpha monoolefin/ester copolymer base resin with a chlorosulfonating agent at a temperature of about 80–120° C., usually in the presence of a free radical initiator and an inert solvent. A typical chlorosulfonating agent is sulfuryl chloride and a typical initiator is 2,2'-azobis(2-methylpropane nitrile). Methods for preparation of chlorosulfonated polymers are discussed, for example, in U.S. Pat. Nos. 2,585,383, and 3,296,222. Neutralization of the acid groups to form the sulfonate salts is preferably effected during latex preparation.

The sulfonic acid salt moieties produced by neutralization of the chlorosulfonated olefin/ester copolymers act as effective internal surfactants because they are homogeneously dispersed at the interface between the latex particle and the external aqueous environment. The number of sulfonyl chloride groups present in the chlorosulfonated polymer is therefore a controlling factor in stabilization of the latex compositions of the invention. If less than about 1.5 weight percent sulfur is present in the polymer, added surfactants are required in order to form stable latexes. In contrast, preparation of latexes derived from chlorosulfonated copolymers containing above 10 weight percent sulfur is undesirable because the polymers lack stability. It is preferred to use chlorosulfonated copolymers as base resins having sulfur contents of 2.0–6.0 weight percent because in some cases the polymeric sulfonate salts having sulfur contents greater than 6 weight percent become water-sensitive.

The chlorosulfonated sulfonate salts suitable for use in the invention contain about 20–70 weight percent chlorine, preferably 25–60 weight percent chlorine. Chlorine levels within the range disclosed promote the formation and effectiveness of chain entanglement which contributes to film toughness and strength. In addition, this level of chlorine improves resistance to attack by acids and bases. Therefore, if the chlorine level is below about 20 weight percent the chemical resistance of films derived from the compositions will be compromised. Also, adhesives derived from the compositions would be soft and lack sufficient tensile strength to form strong films.

Neutralization of the chlorosulfonated olefin/ester copolymers is effected by treatment with aqueous solutions of organic or inorganic bases. Typical bases which act as neutralizing agents include potassium hydroxide, sodium hydroxide, ammonium hydroxide, ammonia, diethanolamine, triethanolamine, triethylamine, and ethanolamine. Although it is preferable to add sufficient base to neutralize 50–100% of the acid groups present, for certain applications neutralization levels as low as 10% are adequate to produce a latex which is self-stabilizing.

The latexes of the invention are generally prepared by intimately mixing an organic solvent solution of the chlorosulfonated olefin/ester copolymers and aqueous base under high shear mixing conditions, for example in a homomixer, a high-shear blender, or a combination of centrifugal pumps. The amount of aqueous base added is such that the solids content of the latex is from 5–75%, and the degree of neutralization of the polymer is at least 10%. Since the latex is self-stabilized it is not necessary to employ surfactants during latex preparation. That is, the latex is substantially free of surfactants and yet an emulsion is obtained which provides films having excellent adhesivity. However, small amounts of anionic or nonionic surfactants can be present in cases where it is desired to further reduce the particle size of the latex or to reduce the surface tension of the latex. Amounts of surfactant up to about 1% by weight of the chlorosulfonated resin salt are sufficient for this purpose. At this low level there is no adverse effect on adhesion. The resultant emulsion may be further refined by removal of the organic solvents, and such removal is preferred for the preparation of low VOC coatings and adhesives.

Conventional additives, such as fillers, thickeners, pigments, wetting agents, dispersing agents, antioxidants, curatives, and flame retardants may also be added to the stable aqueous latexes depending on the particular end-use which is desired.

The latexes are particularly suited for use in the preparation of marine paints, traffic paints, and adhesive primers.

The invention is further illustrated by the following embodiment wherein all parts are parts by weight unless otherwise specified.

EXAMPLE

A stable latex composition containing ammonium salts of chlorosulfonated polyethylene and chlorosulfonated ethylene/vinyl acetate was prepared as follows. A mixture of 71 parts chlorosulfonated polyethylene (40% chlorine, 3% sulfur; prepared from polyethylene having a Brookfield viscosity 350 centipoise at 140° C.), 14 parts chlorosulfonated ethylene/vinyl acetate copolymer (55% chlorine; prepared from an ethylene/vinyl acetate copolymer containing 14% copolymerized vinyl acetate units, melt index 2500), and 15 parts Chlorowax 60–70® chlorosulfonated paraffin wax (60% Cl, viscosity 41 poise at 25° C.) was dissolved in sufficient toluene to make a 30% by weight solution. A 117.8 g sample of the solution was homo-mixed with 96 ml of an aqueous solution of ammonia having a pH of approximately 10 in a Tekmar® homomixer. A stable, milk-like emulsion was achieved.

We claim:

1. A self-stabilized chlorosulfonated resin latex composition comprising an aqueous suspension of a salt of a chlorosulfonated copolymer of a $C_2$–$C_8$ alpha-olefin and a compound selected from the group consisting of $C_1$–$C_{12}$ alkyl esters of unsaturated $C_3$–$C_{20}$ monocarboxylic acids and vinyl esters of saturated $C_2$–$C_{18}$ carboxylic acids, said chlorosulfonated alpha-olefin copolymer having a chlorine content of 20–70 weight percent, based on the weight of said chlorosulfonated alpha-olefin copolymer, and a sulfur content of 1.5–10 weight percent, based on the weight of said chlorosulfonated alpha-olefin copolymer, with the proviso that the latex is substantially free of surfactants.

2. The composition of claim 1 wherein the sulfur content of the chlorosulfonated copolymer is 2–6 weight percent.

3. The composition of claim 1 wherein the compound is an alkyl ester of an unsaturated $C_3$–$C_{20}$ monocarboxylic acid.

4. The composition of claim 3 wherein the monocarboxylic acid is acrylic acid or methacrylic acid.

5. The composition of claim 1 wherein the compound is a vinyl ester of a saturated $C_2$–$C_{18}$ carboxylic acid.

6. The composition of claim 5 wherein the vinyl ester is vinyl acetate.

7. The composition of claim 1 wherein the chlorosulfonate copolymer is chlorosulfonated ethylene/vinyl acetate.

\* \* \* \* \*